United States Patent [19]
Ogawa et al.

[11] Patent Number: 6,014,185
[45] Date of Patent: Jan. 11, 2000

[54] STRUCTURE FOR DRAINING WATERDROPS FOR USE IN TELEVISION RECEIVERS

[75] Inventors: Shinji Ogawa, Osaka, Japan; Tomoyuki Shimamoto, Forrest City, Ark.

[73] Assignee: Sanyo Electric Co. Ltd., Moriguchi, Japan

[21] Appl. No.: 09/025,326

[22] Filed: Feb. 18, 1998

[30] Foreign Application Priority Data

Feb. 18, 1997 [JP] Japan .................................. 9-033496

[51] Int. Cl.⁷ ...................................................... H04N 5/64
[52] U.S. Cl. .............................. 348/818; 348/836; 312/7.2
[58] Field of Search .................... 312/7.2, 229; 348/818, 348/836, 837, 838

[56] References Cited

U.S. PATENT DOCUMENTS

| | | | |
|---|---|---|---|
| 4,360,838 | 11/1982 | Babicz et al. ............................ | 348/818 |
| 4,880,594 | 11/1989 | Fu ............................................. | 312/7.2 |
| 5,359,421 | 10/1994 | Maeda ...................................... | 348/818 |
| 5,431,492 | 7/1995 | Rothschild et al. ..................... | 312/229 |

FOREIGN PATENT DOCUMENTS 62-23191   6/1997   Japan .

*Primary Examiner*—Peter M. Cuomo
*Assistant Examiner*—Gerald A. Anderson
*Attorney, Agent, or Firm*—Armstrong, Westerman, Hattori, McLeland & Naughton

[57] ABSTRACT

A picture tube housed in a cabinet is disposed above a circuit board provided inside the cabinet. The cabinet is provided on the rear surface thereof with a protective wall for preventing waterdrops adhering to the front surface of the picture tube from falling onto the circuit board upon ingressing into the cabinet. Arranged above the protective wall and inside the cabinet are a plurality of projections projecting into a clearance M between the cabinet and the front surface of the picture tube and extending in the direction of fall of the waterdrops from the tube for permitting the waterdrops to flow along the rear surface of the cabinet.

4 Claims, 4 Drawing Sheets

STRUCTURE FOR DRAINING WATERDROPS FOR USE IN TELEVISION RECEIVERS

FIELD OF THE INVENTION

The present invention relates to a structure for draining waterdrops for use in television receivers to prevent water from dripping onto the circuit board below the picture tube installed in the receiver cabinet in the event of waterdrops adhering to the surface of the tube.

BACKGROUND OF THE INVENTION

FIG. 5 is a fragmentary side elevation showing a conventional television receiver. A picture tube 1 is housed in a cabinet 2 having an opening 25 in its front side. The opening-defining edge of the cabinet 2 is opposed to a lower end portion of the picture tube 1 with a clearance M formed therebetween. The cabinet 1 has a front wall provided with a power key 9. A first circuit board 6 opposed to the power key 9 is disposed on the rear side of the front wall and has a switch 8 which is to be pressed by the power key 9. The picture tube 1 is turned on or off by the switch 8.

Provided below the picture tube 1 is a second circuit board 3 which has mounted thereon a known deflection circuit and a synchronization circuit, and radiating plates 30, 30 for preventing overheating of these circuits. The second circuit board 3 is away from the first circuit board 6 and connected thereto by a bundle of electric wires (not shown).

The surface of the picture tube 1 is susceptible to soiling in the case of television receivers, especially those having a display of large size which has gained popularity in recent years. If seriously soiled, the picture tube 1 will be cleaned by wiping with use of a liquid cleaner or water. In such an event, it is likely that the liquid cleaner or waterdrops 4 adhering to the surface of the receiver 1 will flow down the surface and fall onto the inside bottom wall of the cabinet 2 through the clearance M between the tube 1 and the cabinet 2. The amount of dripping cleaner or water, although small, is sufficient to cause an electrical failure to the electronic components on the second circuit board 3.

With the conventional receiver, however, the second circuit board 3 is a sufficient distance away from the front wall of the cabinet 2 and is therefore unlikely to be exposed to the dripping cleaner or water.

It is required in recent years to reduce the thickness of television receivers of the type described, i.e., to give a shortened depth to the cabinet 2. To meet the requirement, there arises a need to position the second circuit board 3 closer to the front side of the cabinet 2.

Further from the viewpoint of a reduction in the number of components and a lower cost, a proposal has already been made on an arrangement wherein the first circuit board 6 is absent. FIG. 6 shows the proposed arrangement, in which an elastically deformable connector 97 is used for attaching the power key 9 directly to the rear side of the cabinet 2, and the switch 8 to be pressed by the key 9 is mounted on a circuit board 3. This arrangement also requires that the circuit board 3 be positioned closer to the front side of the cabinet 2.

The positioning of the circuit board 3 toward the front then involves the likelihood that the cleaner or water 4 flowing down the surface of the picture tube 1 will drip onto the circuit board 3, permitting the electronic components on the board 3 to malfunction electrically.

Incidentally, the present applicant has previously proposed provision of protective walls 7, 7, serving as a roof, between the picture tube 1 and the circuit board 3 as shown in FIG. 7, so that the waterdrops 4 produced on the rear side of the picture tube 1 by condensation will be prevented from falling onto the circuit board 3 (see Published Japanese Utility Model Registration No. 23191/1987). Accordingly, it appears also useful to provide such a protective wall 7 below the picture tube 1 as indicated in a dot-and-dash line in FIG. 6.

Nevertheless, the condensed water 4, when running along the bottom surface of the picture tube 1, will not always drip at a definite location, but is likely drip onto the board 3, clearing the protective wall. Thus, the wall fails to perfectly protect the electronic components on the circuit board 3.

SUMMARY OF THE INVENTION

An object of the present invention is to reliably prevent waterdrops running down the picture tube from falling onto the electronic components on a circuit board disposed in an interior lower portion of the cabinet.

A television receiver comprises a cabinet 2 housing a picture tube 1 and having a circuit board 3 inside thereof, and a protective wall 7 formed on the inner surface of the cabinet 2 for preventing waterdrops 4 adhering to the front surface of the picture tube 1 from falling onto the circuit board 3.

A clearance M positioned above the protective wall 7 and formed between the cabinet 2 and the front surface of the picture tube 1 is provided with a plurality of projections 5 extending downward or obliquely downward from the rear surface of the cabinet 2 for permitting the waterdrops 4 to flow along the cabinet rear surface.

The waterdrops 4 falling off the surface of the picture tube 1 flows through the clearance M between the cabinet 2 and the tube front surface. With the projections 5 extending in the direction of fall of the waterdrops 4, the waterdrops 4 are drawn toward projections 5 by a surface tension acting between the projections and the waterdrops 4, running down the projections 5 and falling along the rear surface of the cabinet 2.

Consequently, the waterdrops 4 are prevented from flowing down the bottom surface of the tube 1 and falling directly onto the circuit board 3. This obviates the malfunction of the electronic components on the circuit board 3.

DETAILED DESCRIPTION OF THE PREFERRED EMBODIMENTS

First Embodiment

An embodiment of the invention will be described below with reference to the drawings concerned.

Figure 1:
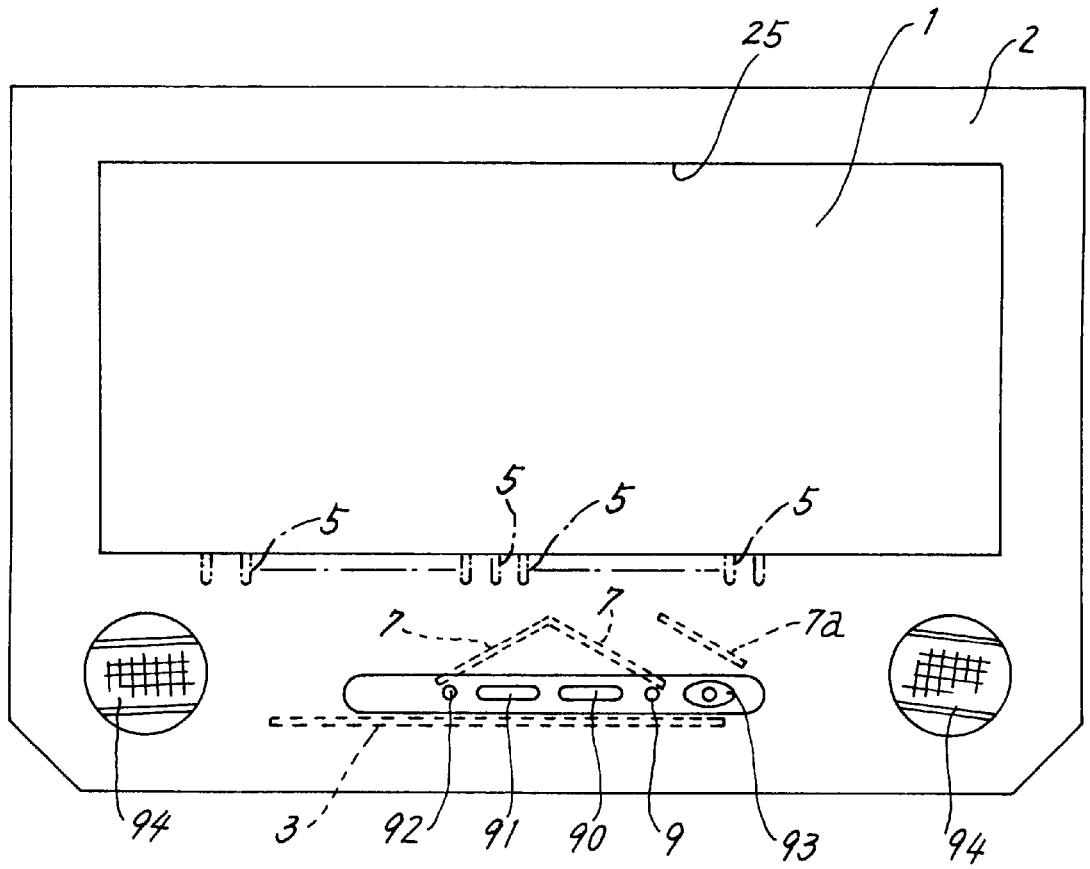
FIG. 1 is a front view of a television receiver.
Figure 2:
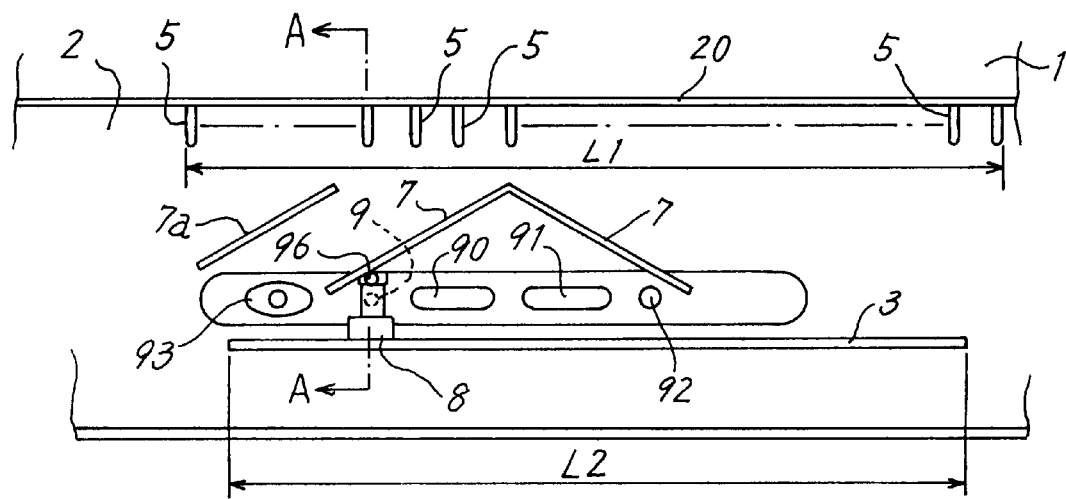
FIG. 2 is a fragmentary rear view of the television receiver.
Figure 3:
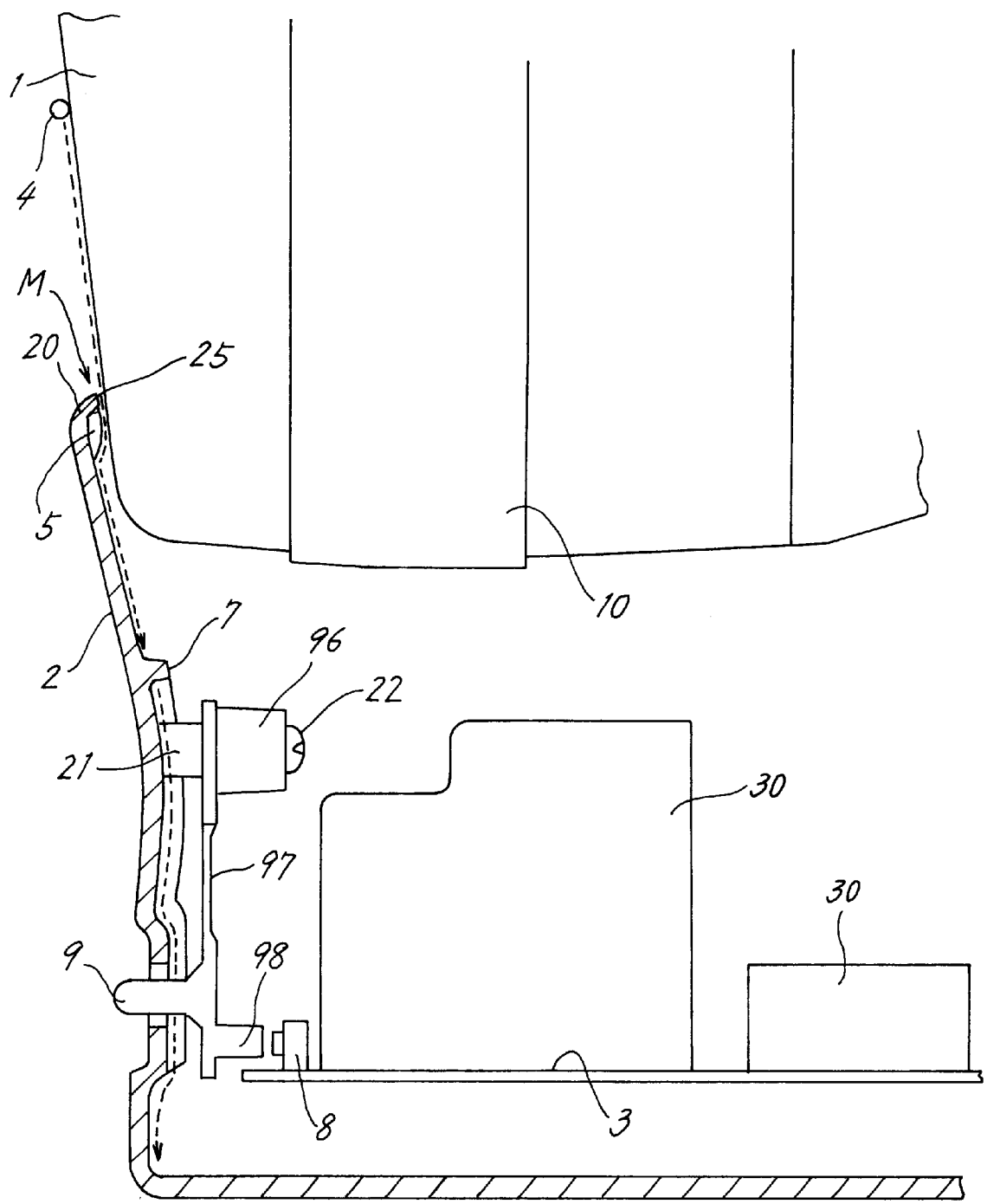
FIG. 3 is a side elevation taken along the line A—A in FIG. 2.

FIG. 1 is a front view of a television receiver, FIG. 2 is a fragmentary rear view of the receiver, and FIG. 3 is a view in section taken along the line A—A in FIG. 2.

FIG. 1 shows a picture tube 1 which is a large display, 29 inches in size. The picture tube 1 is housed in a cabinet 2 having an opening 25 formed in its front wall. Speakers 94, 94 are provided on the front wall at opposite sides of and below the opening 25.

The cabinet 2 is prepared from polystyrene or like resin by injection molding. The front wall of the cabinet 2 is centrally provided with a power key 9 for turning on or off the power supply, volume key 90, channel change key 91, menu key 92 to be pressed for adjusting color and contrast, and remote-control detector 93.

As seen in FIG. 3, installed horizontally in the interior of the cabinet 2 is a circuit board 3 having mounted thereon a known deflection circuit (not shown) and radiating plates 30, 30 for the deflection circuit. Disposed at one end of the circuit board 3 is a switch 8 which is to be pressed by the power key 9. Although the circuit board 3 also has mounted thereon the switches to be pressed by the respective volume key 90, channel change key 91 and menu key 92, these switches will not be described for the sake of brevity.

The opening-defining lower edge of the cabinet 2 provides an inwardly bent portion 20. Formed on the bent portion 20 inside thereof are a plurality of projections 5 extending vertically and arranged side by side. The projections 5 are positioned as retracted downward by about 0.2 mm from the top end of the bent portion 20, and are circular-arc in cross section. The picture tube 1 is attached to the cabinet 2 by a band 10 provided around the tube 1.

As shown in FIG. 2, the projections 5 are arranged in a horizontal row at a predetermined interval, i.e., at an interval of about 4 mm. The projections 5 are provided over a section having a width L1, which is greater than the horizontal width L2 of the circuit board 3. The projections are arranged at an interval of about 4 mm without interconnection for the reason to be described later.

The cabinet 2 is formed on the rear side thereof with three protective walls 7, 7, 7a which are positioned between the arrangement of projections 5 and the circuit board 3 for allowing dripping waterdrops 4 to flow downward thereal-ong. These protective walls 7, 7, 7a are provided over the power key 9, volume key 90, channel change key 91 and menu key 92. The protective wall 7a, which is positioned at the right end of the wall arrangement when seen from the front as shown in FIG. 1, is inclined rightwardly downward, while the other protective walls 7, 7 are joined at their upper ends in an inverted V-form. The protective walls 7, 7a readily permit waterdrops 4 to flow down since they are inclined downward i.e., toward the direction of fall of the waterdrops 4.

With reference to FIG. 3, the picture tube 1 has a front surface bulging generally to a circular-arc form, while the opening-defining edge of the cabinet 2 is to be in contact at its bent portion 20 with a lower end portion of the tube 1, whereas due to dimensional variations involved in the front surface of the tube 1, a clearance M is created between the tube lower end portion and the cabinet bent portion 20. The projections 5 are molded integrally with the cabinet 2 and positioned close to the tube lower end portion. The circuit board 3 is disposed a small distance away from the front wall of the cabinet 2.

Below one of the protective walls 7, the cabinet 2 has a boss 21 projecting inward from its rear side. The power key 9 is attached by an elastically deformable connector 97 to a mount 96 which is fastened to the boss 21 with a screw 22. The power key 9 is further integrally provided with a contact piece 98 for pushing in the switch 8. The protective wall 7 is positioned over the boss 21. When the power key 9 is pressed, the connector 97 deflects as supported by the mount 96, and the contact piece 98 pushes in the switch 8 to turn on or off the power supply.

Effect to Drain Waterdrops

When the surface of the picture tube 1 is cleaned by wiping using a liquid cleaner or water, it is likely that the cleaner or waterdrops adhering to the tube 1 will run down the surface as seen in FIG. 3. The waterdrops 4 ingress into the clearance M between the end face of the bent portion 20 and the tube lower end portion. However, because the clearance between the picture tube 1 and the projections 5 is small and further because the projections 5 extend toward the direction of fall of the waterdrops 4, a surface tension readily acts between the waterdrops 4 and some of the projections 5.

The waterdrop 4 is drawn to the projection 5 by the surface tension, running down the projection 5 and falling along the rear surface of the cabinet 2. Some of the waterdrops 4 flow down the upper surfaces of the protective walls 7, 7, 7a without wetting the power key 9 which is covered with the protective wall 7.

The waterdrops 4 flowing down the rear surface of the cabinet 2 or the protective walls 7, 7, 7a collect on the bottom surface of the cabinet 2. Since the interior of the cabinet 2 has a high temperature due to the radiation of heat from the picture tube 1, the collecting waterdrops 4 evaporate immediately.

Thus, the waterdrops 4 are prevented from flowing along the bottom surface of the picture tube 1 and falling onto the circuit board 3. This obviates the malfunctions of the switch 8 and other electronic components on the circuit board 3. Because the section wherein the projections 5 are arranged has a width L1 which is greater than the width L2 of the circuit board 3 (see FIG. 2), projections 5 are invariably present above the circuit board 3. This arrangement precludes the waterdrops 4 from flowing around the tube 1 to the bottom surface thereof and falling onto the circuit board 3.

Second Embodiment

Figure 4A:
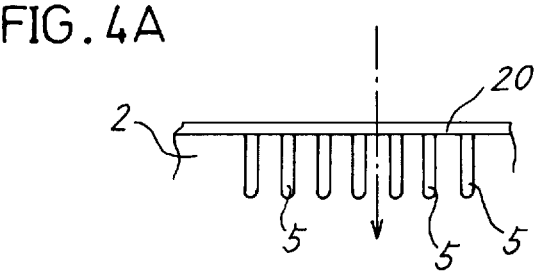
FIG. 4 includes rear views of a cabinet, (a) showing an arrangement of projections extending along the direction of fall of waterdrops, (b) showing another arrangement of projections extending as inclined with respect to the direction of fall of waterdrops.

In the case where the projections extend vertically as arranged side by side as seen in FIGS. 2 and 4(a), it is likely that waterdrops 4 will pass between the projections 5 if small, directly flowing down the picture tube 1 and falling onto the circuit board 3.

Figure 4B:
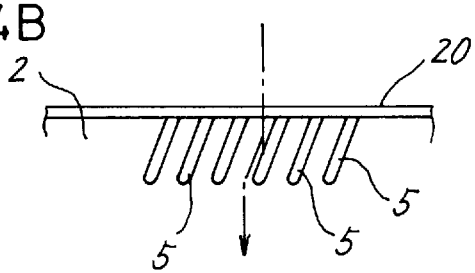
Figure 5:
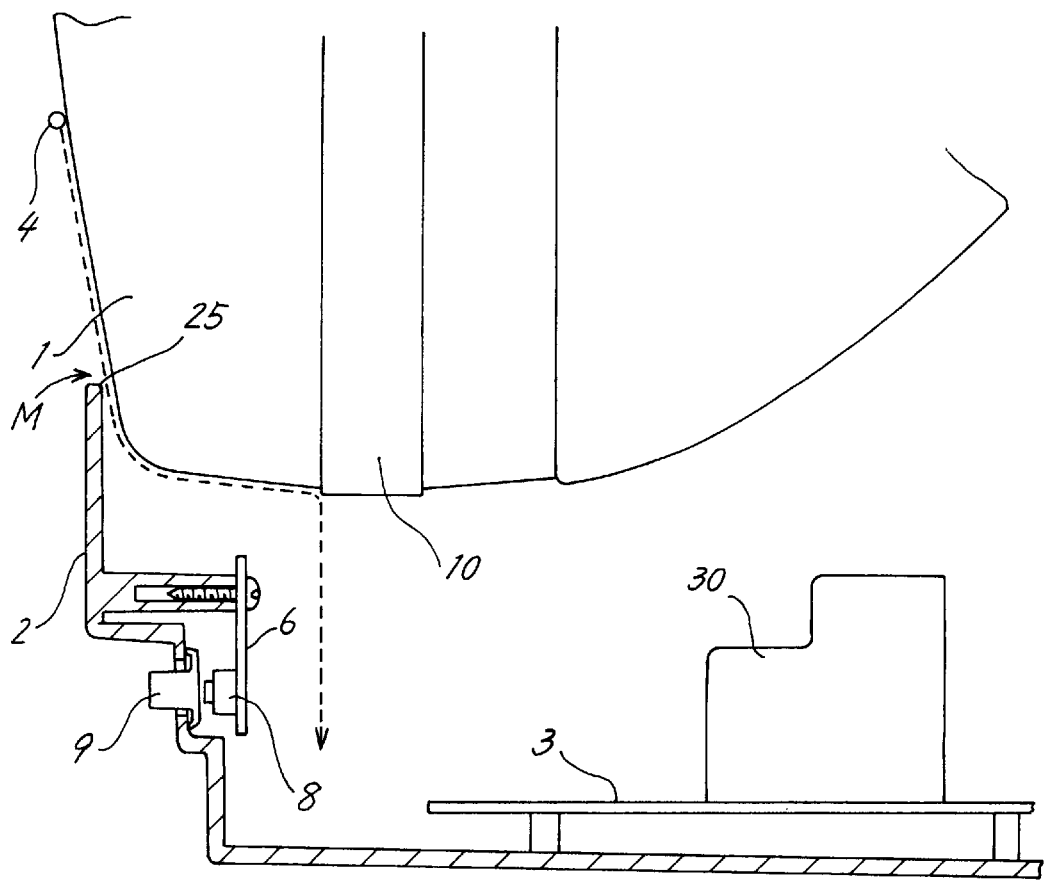
FIG. 5 is a side elevation in section of a conventional television receiver.
Figure 6:
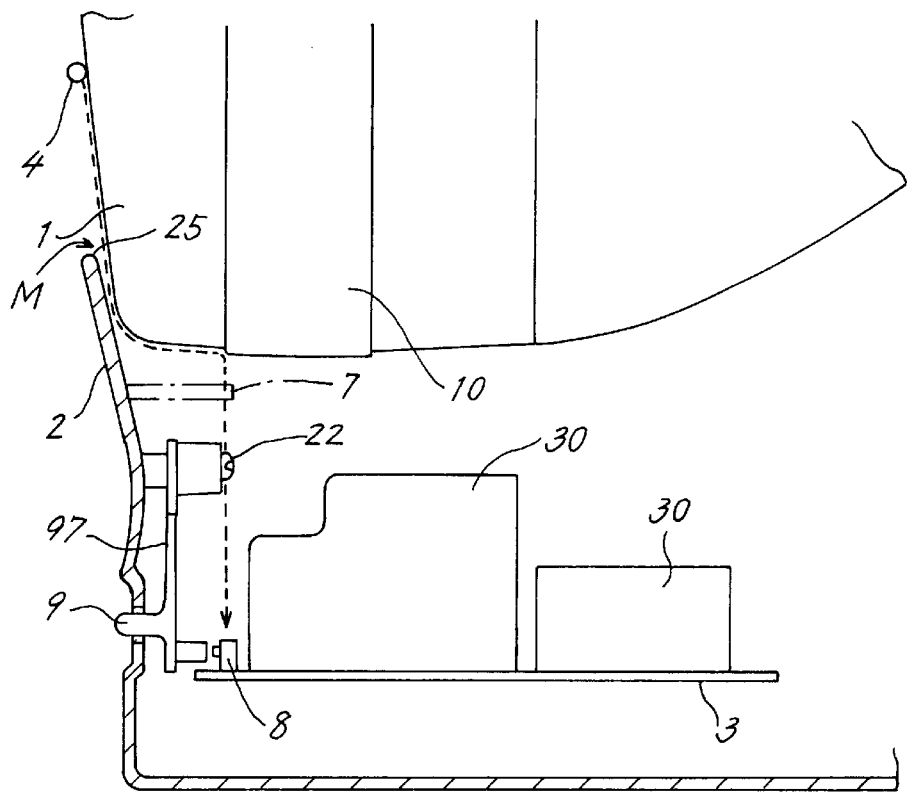
FIG. 6 is a side elevation in section of a conventional television receiver wherein a circuit board is positioned close to the front.
Figure 7:
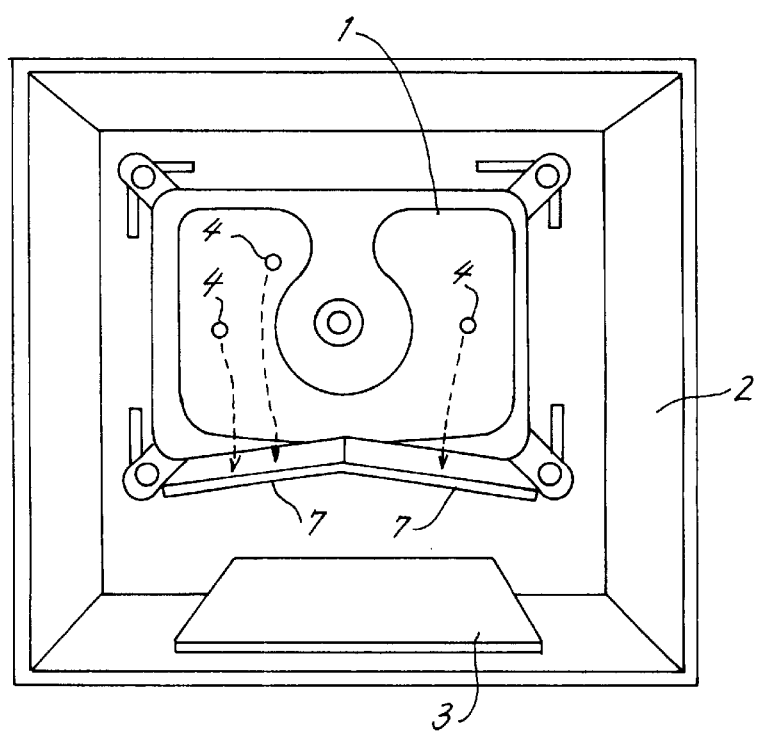
FIG. 7 is a rear view of A television receiver previously proposed by the present applicant.

Accordingly, the present applicant has conceived the idea of arranging the downwardly extending projections 5 as inclined with respect to the direction of fall of the waterdrops 4 as shown in FIG. 4(b). It is desired that the upper end of each projection 5 be positioned on the same vertical line as the lower end of another projection 5 at the right of and immediately adjacent to and the projection 5. When the projections 5 are thus arranged, the waterdrops 4 falling off the surface of the picture tube 1 invariably come into contact with a side face of the projection 5 to run down and flow along the rear surface of the cabinet 2, whereby the waterdrops 4 are reliably prevented from falling onto the circuit board 3.

In the foregoing embodiments, the interval between the projections 5 is about 4 mm. Our experiments have revealed that if the interval between the projections 5 is 2 to 3 mm, the opening-defining lower edge portion of the cabinet 2 is given increased rigidity, that is, this portion become difficult to deflect. It is known that the picture tube 1 is easy to install in the cabinet 2 if the cabinet 2 is slightly deflected. The tube 1 becomes difficult to install if the cabinet 2 is difficult to deflect. When all the projections 5 are interconnected into an integral portion, the cabinet 2 becomes more difficult to deflect.

Conversely, if arranged at an excessive interval, the projections 5 become less effective, permitting the waterdrops 4 to pass between the projections 5. Accordingly, the projections 5 are given an interval of about 4 mm as determined by trial and error.

The projections 5, which are circular-arc in cross section, may have other cross section, e.g., a triangular or rectangular form.

What is claimed is:

1. An apparatus comprising a cabinet, a television picture tube housed within the cabinet and having a viewing surface within an opening in the cabinet, a circuit board within the cabinet and located beneath the television picture tube, and a structure for draining waterdrops from the television picture tube as housed in the cabinet, the structure comprising a protective wall formed on an inner surface of the cabinet beneath the viewing surface for preventing waterdrops adhering to the viewing surface of the picture tube from flowing onto the circuit board, the structure further including, in a clearance M above the protective wall and formed between the cabinet and the viewing surface of the picture tube, a plurality of projections extending toward, or obliquely toward, the circuit board, for causing waterdrops flowing from the viewing surface of the tube through the clearance to flow along an interior surface of the cabinet located beneath the clearance.

2. An apparatus according to claim 1 wherein the circuit board has a dimension L2 beneath the clearance and the projections are spaced apart from one another along the clearance over a dimension L1 which is larger than the dimension L2 of the circuit board.

3. An apparatus according to claim 1 wherein the projections extend toward the circuit board.

4. An apparatus according to claim 3 wherein an upper end of each of the projections and a lower end of the projection immediately adjacent thereto are positioned on a vertical line toward the circuit board.

\* \* \* \* \*